(No Model.)
W. T. ATKINS.
HARMONICA FLUTE.
No. 245,929. Patented Aug. 23, 1881.
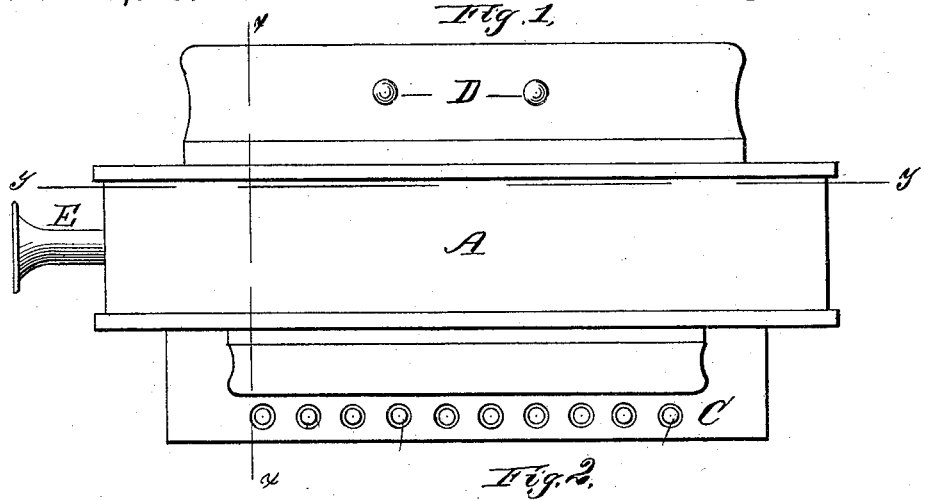
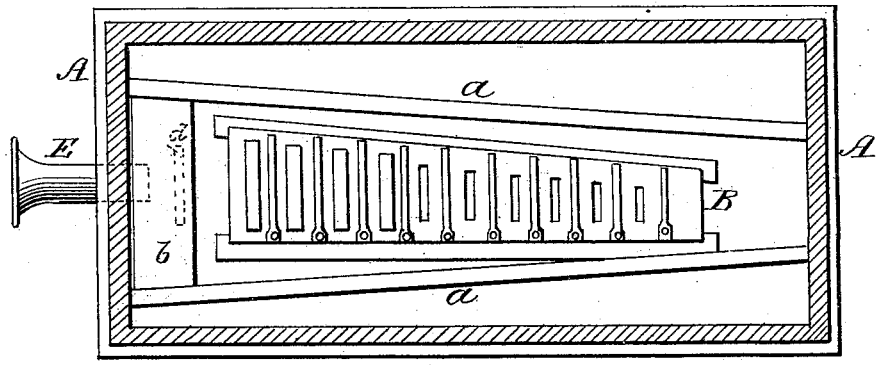
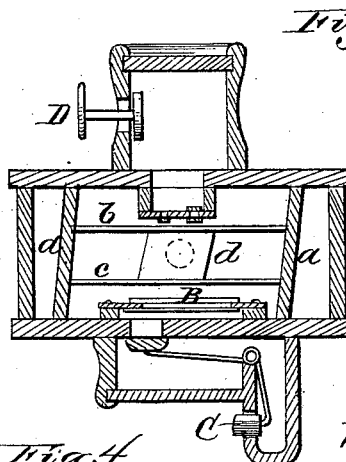
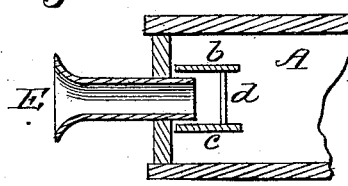
Witnesses:
W. C. McArthur
L. L. Miller
Inventor
William T. Atkins
per Chas. H. Fowler
Attorney.

UNITED STATES PATENT OFFICE.

WILLIAM T. ATKINS, OF KING'S FERRY, FLORIDA.

HARMONICA-FLUTE.

SPECIFICATION forming part of Letters Patent No. 245,929, dated August 23, 1881.

Application filed June 18, 1881. (No model.)

*To all whom it may concern:*

Be it known that I, WILLIAM T. ATKINS, a citizen of the United States, residing at King's Ferry, in the county of Nassau and State of Florida, have invented certain new and useful Improvements in Musical Instruments; and I do hereby declare that the following is a full, clear, and exact description of the same, reference being had to the annexed drawings, making a part of this specification, and to the letters and figures of reference marked thereon.

Figure 1 of the drawings is a side elevation of my invention. Fig. 2 is a horizontal section taken on line $y\ y$ of Fig. 1. Fig. 3 is a cross-section taken on line $x\ x$ of Fig. 1, and Fig. 4 is detail view, showing the mouth-piece and deflecting-plates.

The present invention has relation to certain new and useful improvements in that class of musical instruments known as "harmonica-flutes;" and it consists in the details of construction substantially as shown in the drawings and hereinafter described.

In the accompanying drawings, A represents a box or casing of wood or other suitable material, and of rectangular or other desirable shape, said box or casing being of the required depth to contain the several parts hereinafter enumerated.

The box or casing A contains a reed-board, B, and is provided with a key-board, C, and stops or keys D, said parts being similar to those ordinarily used in accordions and harmonica-flutes, and therefore need no further description.

Within the casing A are secured upright partitions $a$, one upon each side of the reed-board B, so that the wind supplied to the instrument is kept within a very small compass and confined almost entirely to the reed-board. This feature greatly lessens the effort of the performer in supplying the instrument with the required amount of wind to produce the volume of tone necessary, thus rendering the instrument easily played by a child. The wind is supplied by a mouth-piece, E, preferably of metal, connected to the end of the casing A, and extending into the same some little distance.

Above and below the projecting end of the mouth-piece E, or that portion located within the casing A, are horizontal plates $b\ c$, and directly in front of the end of the mouth-piece is a vertical or upright plate, $d$, connected to the inner sides of the plates, $b\ c$. The object of the plates $b\ c$ is to prevent the wind as it escapes from the mouth-piece E from descending or ascending, and by the addition of the plate $d$ it is deflected to the sides of the partitions $a$ until it passes beyond the plates $b\ c$, when the wind is distributed with equal force and volume over the reed-board B. This deflection of the wind and its distribution over the reed-board of the instrument produces a much softer and more even tone, requiring less power to supply it with the necessary amount of wind to produce a clear note.

Having now fully described my invention, what I claim as new, and desire to secure by Letters Patent, is—

In a musical instrument provided with the usual reed-board B, key-board C, and stops or keys D, the mouth-piece E and plates $b\ c\ d$, in combination with the partitions $a$, substantially as and for the purpose specified.

In testimony that I claim the above I have hereunto subscribed my name in the presence of two witnesses.

WILLIAM T. ATKINS.

Witnesses:
JOSEPH HADDOCK,
WILLIS A. BLAISDELL.